Oct. 16, 1934.                M. MADSEN                1,977,074
                           AIR PURIFYING DEVICE
                           Filed May 19, 1931
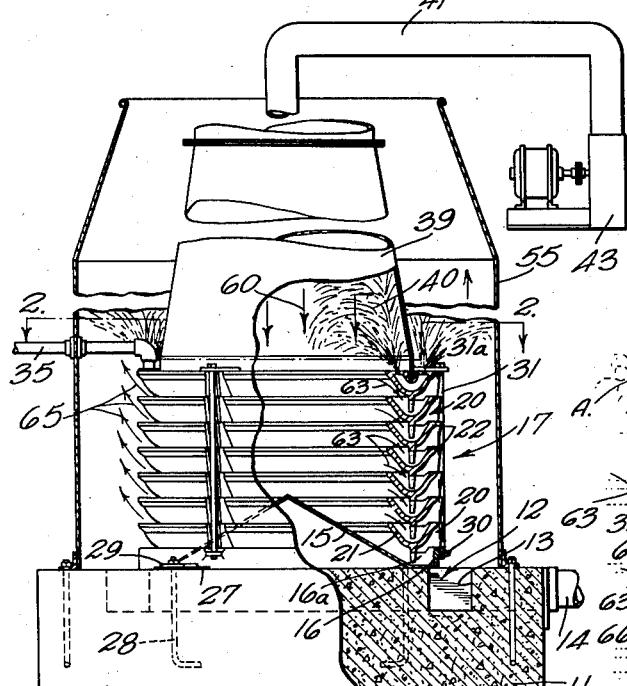
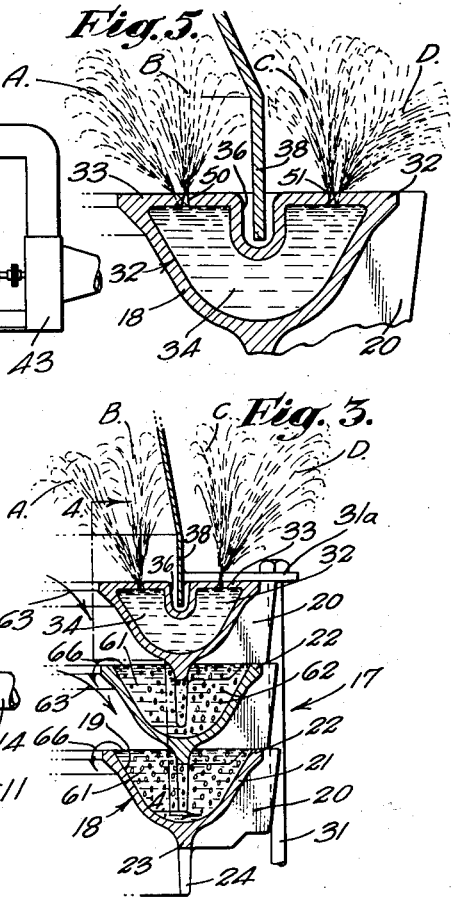
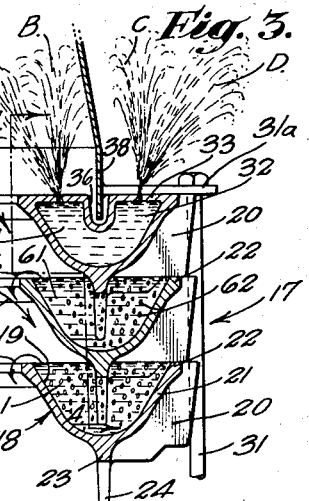
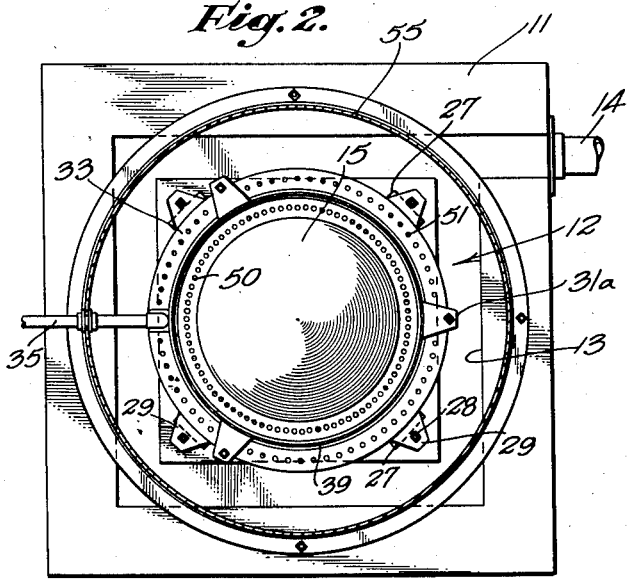
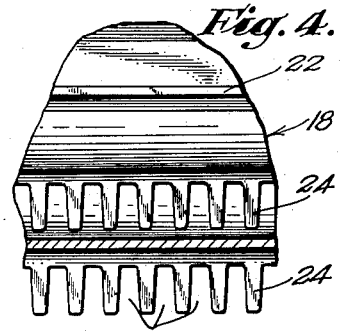
INVENTOR:
MARTIN MADSEN,
BY
ATTORNEY.

Patented Oct. 16, 1934

1,977,074

UNITED STATES PATENT OFFICE 1,977,074

AIR PURIFYING DEVICE

Martin Madsen, Huntington Park, Calif., assignor to Madsen Iron Works, Huntington Park, Calif., a corporation of California Application May 19, 1931, Serial No. 538,411

5 Claims. (Cl. 261—111)

My invention relates to apparatus for eliminating dust or other foreign matter from air, and relates particularly to a type of apparatus which will remove from air those dust particles which ordinarily cannot be removed from the air by the ordinary type of cyclone separator.

My invention is useful wherever the air passing from apparatus is dust laden and must be purified before the air can be returned to the atmosphere. My invention has a marked utility in connection with paving plants wherein the air passing through various apparatus, and particularly the rotary drum, carries considerable dust and other foreign matter. It is ordinary practice to provide a cyclone separator for removing this foreign matter from the air, but in actual practice it has been found that much of the small particles of foreign matter is not separated by this cyclone separator.

It is an object of my present invention to provide an apparatus in which the air (or other gas) to be cleansed is subjected to the action of a cleansing liquid by being brought into intimate contact with the liquid and at the same time being divided into a multiplicity of relatively small streams in order that intimate contact and thorough washing of the air may be obtained.

It is a further object of my invention to first treat the air to be cleansed with a spray of liquid and thereafter to force the air through a body of liquid, the air being divided into a multiplicity of small streams and the air being passed through the liquid with such pressure that the liquid is thoroughly agitated, all of these actions cooperating to clean the air.

A further object of my invention is to provide a design of air cleaner having the features of novelty and the objects mentioned above in which a plurality of bubble troughs is provided, each of which has bubble grids which cause the air to flow through the bubble troughs and below the bubble grids in order to reach the exterior. The bubble troughs are filled with a liquid, and therefore the air is caused to pass below the surface of the liquid in order to reach the exterior.

In the preferred form of my invention there is a plurality of bubble troughs and associated bubble grids, the bubble troughs being arranged in cascade relation in order that the liquid which may overflow from one of the bubble troughs will drop downward into the following bubble trough. One of the features of the preferred form of my invention is that each of the bubble troughs has a separate communication with the interior of the cleaning apparatus.

Other objects of my invention reside in the details of construction and in various features of operation, such as a novel cleaning feature, all of which will be pointed out in detail in the following description of the preferred form of my invention.

Referring to the accompanying drawing,

Fig. 1 is an elevational view partly sectioned.

Fig. 2 is a section taken on the line 2—2 of Fig. 1.

Fig. 3 is an enlarged detail through a plurality of bubble troughs.

Fig. 4 is a fragmentary section taken on the line 4—4 of Fig. 3.

Fig. 5 is an enlarged fragmentary view of the upper bubble cup of the invention.

Referring to the drawing in detail, the numeral 11 represents a foundation which provides a water receiving sink 12 in the form of a continuous channel 13 which may be in the form of a square when viewed in plan as shown in Fig. 2, and to which is connected an outlet pipe 14. Supported by the foundation is a drain pan 15. The drain pan 15 is conical in form and is centralized relative to the sink 12 in such a position that portions of the periphery thereof extend outwardly over the sink 12, and the apex thereof extends upwardly from the foundation coaxially relative to the vertical axis of the square channel 13. The drain pan 15 is provided with a vertically extending peripheral rim 16 cooperating with the conical portion thereof to form an annular channel 16a upon which is supported a superimposed series of annular bubble cups 17 of the invention.

Each of the bubble cups 17 comprises a body portion 18 providing an upwardly opening annular trough 19 which is cup-shaped in cross-section, as shown in Figs. 1 and 3. Formed on the outer periphery of each of the bubble cups 17 in spaced relationship, is a plurality of outwardly extending supporting webs 20. The webs 20 of the lowermost bubble cup, designated by the numeral 21, are adapted to rest on the peripheral rim 16 of the drain pan 15. The supporting webs 20 of each of the superimposed bubble cups 17 rest on the outer peripheral rim 22 of the bubble cup directly beneath in such a manner that the series of bubble cups are coaxially aligned and are maintained in spaced relationship as shown in Figs. 1 and 3. Formed on the bottom of the body portion 18 of each of the bubble cups 17 is a central, depending, annular bubble grid 23, the upper part of which adjacent the body 18, forms an imperforate wall, and the lower part of which is provided with depending teeth 24 in order that there be provided a plurality of separate passages 25, as shown best in Fig. 4. As will be clearly seen with reference to Figs. 1 and 3, the bubble grid 23 of each of the bubble cups 17 projects downwardly into the annular trough 19 of the bubble cup directly beneath, and the bubble grid of the lowermost bubble cup 17 projects downwardly into the annular channel 16a.

For the purpose of retaining the bubble cups 17 and the drain pan 15 in their relative positions, I provide the drain pan 15 with a plurality of foot members 27 which extend outwardly in spaced relationship from the outer periphery of the rim 16. Projecting upwardly from the foundation 11 adjacent the foot members 27, is a plurality of anchor bolts 28 to which the foot members 27 are secured, either directly or by means of gusset plates 29, as shown. Provided also on the periphery of the rim 16 is a plurality of relatively spaced lugs 30 which serve as engaging means adapted for threaded engagement with a plurality of tie bolts 31 which are connected to the uppermost bubble cup by gusset plates 31a, as shown, and which are effective to retain the series of bubble cups 17 in position relative to the drain pan 15.

The uppermost bubble cup 32 is provided with an integral top wall 33 providing a closed annular chamber 34, serving as the pressure chamber of the invention, and to which is connected a liquid delivery pipe 35, as shown in Figs. 1 and 2. Formed in the wall 33, coaxially with the series of bubble cups 17, is an annular depression 36. Projecting downwardly into the depression 36, in spaced relationship therewith, as shown, is an annular, vertically extending skirt 38 comprising the lower edge of a conical shroud 39 providing a treating chamber 40. The shroud 39, including the skirt 38, may be supported in spaced relationship with the depression 36 in any suitable manner, such as by welding the gusset plates 31a, as shown in Fig. 3. Connected to the upper end of the shroud 39 is a gas or air supply pipe 41 which in turn is connected to a suitable pressure pump 43.

Referring in particular to Figs. 2, 3, and 5, I show the upper wall 33 of the pressure chamber 34 as being provided with an inner circular series of openings 50 communicating with the interior of the treating chamber 40, and an outer circular series of openings 51 communicating with the space surrounding the exterior of the shroud 39. Referring particularly to Fig. 5, these openings are shown as being convergent from the interior of the pressure chamber 34 towards the exterior thereof in the form of spray jets. Half of the openings 50 comprising the inner series of jets are formed on vertical axes and the alternate openings 50 are formed on inwardly sloping axes. Half of the openings 51 comprising the outer series of jets are formed on vertical axes and the alternate jets 51 are formed on outwardly sloping axes, as best shown in Fig. 5. Supported by the base 11 and surrounding the apparatus including the series of bubble cups 17 and the shroud 39, is a housing 55 which protects the apparatus from winds.

The operation of my invention is substantially as follows:

Liquid is delivered under pressure to the pressure chamber 34 through the delivery pipe 35, this liquid being water in the usual use of the invention. When a suitable pressure is built up in the pressure chamber 34 the liquid therein is forced outwardly through the openings 50 and 51. It will be clear with reference to Figs. 3 and 5 that the inwardly sloping jets included in the inner series of openings 50 will tend to throw the liquid inwardly toward the center of the chamber 40 in the form of a fine spray "A", this spray, together with the vertically directed spray "B" issuing from the vertical openings 50, completely drenching the interior area of the treating chamber 40 with a fine "rain." The vertically directed spray "C" issuing from the vertical openings 51, and the outwardly directed spray "D" issuing from the outwardly sloping jets 51 cooperate to similarly drench the annular space between the exterior of the shroud 39 and the housing 55.

The pressure pump 43 is put into operation, and air is drawn from a prior separating means, such as a cyclone separator, or from any apparatus from which dust laden air (or other gas) is emitted. This air or gas is forced through the supply means 41 into the chamber 40 of the shroud 39. The air passes downward, as indicated by the arrows 60 of Fig. 1, and is brought into contact with the liquid sprays "A" and "B" with which the dust laden air is intimately mixed. The troughs 19 of the bubble cups 17 are each filled with a body of liquid 61 which forms a seal; and therefore a pressure is developed within the chamber 40. As this pressure is built up the air in the form of bubbles, as indicated at 62 in Fig. 3, is forced downward through the bodies of liquid 61, access being had to the separate troughs 19 from the interior of the apparatus, as indicated by arrows 63 in Figs. 1 and 3. These bubbles in passing from the inner parts of the bubble cups to the outer parts thereof are divided into separate streams by means of the teeth 24, and these separate streams pass through the multiplicity of passages 25. The bubbles of air passing through the bodies of liquid 61 thoroughly agitate the fluid, causing the dust ladened bubbles of air to be brought into intimate contact with the liquid and thoroughly cleansed. When the air passes upward from the surface of the bodies of liquid 61, it is subjected to the action of the outer sprays "C" and "D", and a further cleaning action occurs. The air passes upward through the housing 55, as indicated by the arrows 65, and reaches the atmosphere through the upper end thereof.

The liquid sprays "A" and "B" fall downward onto the drain pan 15 and are delivered thereby to the annular channel 16a, flowing through the multiplicity of passages 25 provided by the grid 23 of the lowermost bubble cup 21. A portion of the liquid spray "B" flows downward along the wall of the shroud 39, over the surface of the pressure chamber 34 and into the bubble cup 17 immediately below the pressure chamber 34. As shown in Fig. 3, the liquid in each bubble trough 19 will overflow the peripheral rims thereof, as indicated by the arrow 66, and will flow downward into the bubble trough 19 immediately therebelow. In this manner the bubble troughs will all be kept full of liquid and it will not be necessary to provide a separate means for replenishing the supply of liquid. The liquid flowing from the lower bubble trough drops into the channel 16a and upon overflowing the annular rim 16 of the drain pan 15, finds its way into the sink 12, where the foreign particles may settle therefrom, and the liquid passes outward through the outlet pipe 14.

From the foregoing description, the cleaning action which is performed on the dust laden gas or air will be fully understood. The particular arrangement of the bubble troughs is important to the invention since it provides for a large capacity and provides for the successful replenishing of the liquid in each of the bubble troughs as the overflowing occurs. There is sufficient agitation in each of the bubble troughs to prevent the foreign matter from settling therein and clogging up the parts. However, if it should be desired to clean the apparatus, this could be done by supplying a relatively large amount of water through the pipe 35, which would cause a greater circulation of water through the various bubble troughs and assure a thorough cleaning of the walls thereof.

I claim as my invention:

1. In an apparatus for removing foreign particles from gas, the combination of: walls forming a treating chamber; bubble troughs arranged in communication with said chamber, said bubble troughs being in substantially vertical alignment; means for supplying a liquid to said bubble troughs, said liquid flowing downwardly from one of said bubble troughs to the other within said chamber; and means for introducing a gas to be treated into said chamber, said gas being caused to flow outwardly through said cascading liquid and to flow outwardly through said bubble troughs.

2. In an apparatus for removing foreign particles from gas, the combination of: walls forming a treating chamber; means for supplying gas to be treated to said treating chamber; liquid introducing means in said treating chamber; and bubble trough means through which gas passes from the interior to the exterior of said treating chamber, said liquid passing downwardly along said bubble trough means and forming a cascade through which said gas must pass.

3. In an apparatus for removing foreign particles from gas, the combination of: walls forming a treating chamber; means for supplying gas to be treated to said treating chamber; liquid introducing means on the exterior of said treating chamber; and bubble trough means through which gas passes from the interior to the exterior of said treating chamber, said liquid passing downwardly outside said treating chamber and along said bubble trough means and forming a cascade through which said gas must pass.

4. In an apparatus for removing foreign particles from gas, the combination of: a base; bubble trough means defining walls of a treating chamber above said base; means for supplying said bubble trough means with liquid, said liquid being sprayed thereby into said gas to be treated, said liquid cascading downward in said treating chamber over said bubble trough means; means for supplying said treating chamber with gas to be cleaned, said gas passing outward from said treating chamber through said cascading liquid and said bubble trough means; a housing surrounding said treating chamber and providing a space into which said gas passes upon leaving said bubble trough means; and walls forming a drain passage in said space provided by said housing, said liquid flowing outward from said treating chamber into said drain passage.

5. In an apparatus for removing foreign particles from gas, the combination of: a base; bubble trough means defining walls of a treating chamber above said base; means for supplying said bubble trough means with liquid, said liquid being sprayed thereby into said gas to be treated, said liquid cascading downward in said treating chamber over said bubble trough means; means for supplying said treating chamber with gas to be cleaned, said gas passing outward from said treating chamber through said cascading liquid and said bubble trough means; a housing surrounding said treating chamber and providing a space into which said gas passes upon leaving said bubble trough means; walls forming a drain passage in said space provided by said housing, said liquid flowing outward from said treating chamber into said drain passage; and a second liquid supply means for spraying liquid into the space provided by said housing.

MARTIN MADSEN.